United States Patent
Quah (10) Patent No.: US 8,095,242 B2
(45) Date of Patent: Jan. 10, 2012

(54) METHOD FOR CONTROLLING THE OPERATION OF A DEVICE FOR DISPENSING HOT LIQUID

(75) Inventor: Peng Chau Quah, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 388 days.

(21) Appl. No.: 12/307,825

(22) PCT Filed: Jul. 4, 2007

(86) PCT No.: PCT/IB2007/052609
§ 371 (c)(1),
(2), (4) Date: Jan. 7, 2009

(87) PCT Pub. No.: WO2008/007306
PCT Pub. Date: Jan. 17, 2008

(65) Prior Publication Data
US 2009/0312879 A1 Dec. 17, 2009

(30) Foreign Application Priority Data
Jul. 11, 2006 (EP) .................................... 06116932

(51) Int. Cl.
*G05D 11/00* (2006.01)
(52) U.S. Cl. ............ 700/283; 700/300; 222/67; 99/281; 99/323.3
(58) Field of Classification Search .......... 700/281–283, 700/299, 300; 222/67, 146.1; 99/280–281, 99/323.3
See application file for complete search history.

(56) References Cited

U.S. PATENT DOCUMENTS

| 4,353,293 | A | * | 10/1982 | Illy ................................. 99/283 |
| 4,565,121 | A | * | 1/1986 | Ohya et al. ...................... 99/281 |
| 5,283,854 | A | | 2/1994 | Schiebelhuth |
| 5,408,917 | A | | 4/1995 | Lussi |
| 5,778,765 | A | | 7/1998 | Klawuhn et al. |
| 6,118,933 | A | * | 9/2000 | Roberson ....................... 392/442 |
| 7,401,545 | B2 | * | 7/2008 | Hu et al. ......................... 99/281 |
| 7,650,247 | B2 | * | 1/2010 | Leveque ......................... 702/64 |
| 2004/0118298 | A1 | | 6/2004 | Lee |
| 2005/0284304 | A1 | | 12/2005 | Kobylarz |
| 2006/0096465 | A1 | | 5/2006 | Hu et al. |

FOREIGN PATENT DOCUMENTS

| EP | 0771542 B1 | 5/1997 |
| EP | 1645215 A1 | 4/2006 |
| WO | 2005094644 A1 | 10/2005 |

* cited by examiner

Primary Examiner — Kakali Chaki
Assistant Examiner — Nathan Laughlin
(74) Attorney, Agent, or Firm — Sherry Austin (57) ABSTRACT

A beverage maker for making a hot beverage includes a boiler for heating a quantity of water, and a pump. When the beverage maker is operated, a heating element of the boiler is activated, and the water inside the boiler is heated. When the temperature of the water has reached a predetermined value, a thermostat which is arranged in an electronics circuit for energizing the pump is closed, and a pumping action is started. As a result, water exits the boiler, and passes a thermostat which is arranged downstream of the boiler, and which is arranged in an electronics circuit for energizing the heating element. Under the influence of the hot water, a set point of this thermostat is reached, and this thermostat opens, so that the electronics circuit for energizing the heating element is interrupted, and the heating element is deactivated.

10 Claims, 5 Drawing Sheets

METHOD FOR CONTROLLING THE OPERATION OF A DEVICE FOR DISPENSING HOT LIQUID

FIELD OF THE INVENTION

The present invention relates to a method for controlling the operation of a device for dispensing hot liquid, comprising a transporting system for transporting water through the device and heating means for heating water, and to a device which is suitable to be controlled by applying this method.

In particular, the present invention is applicable in the field of devices for preparing a hot beverage.

BACKGROUND OF THE INVENTION

In a process of preparing a hot beverage, a temperature of the water is an important factor. This is particularly true in the case of a process of preparing coffee on the basis of a quantity of ground coffee beans and hot water. In such a case, in order to have a good extraction of the ground coffee beans, it is preferred if the temperature of the water that is used in the coffee making process is between 90° C. and 96° C.

Usually, coffee is prepared by using a coffee maker. A specific type of coffee maker is a coffee maker which is suitable for preparing quantities of coffee on the basis of coffee pads, i.e. envelopes filled with a quantity of ground coffee beans, wherein the envelopes are permeable to liquid. In general, such a coffee maker comprises a sealable brew chamber which is adapted to receive one or more coffee pads. During operation of the coffee maker, a quantity of hot water is forced to flow through the at least one coffee pad. In the process, the envelope of the coffee pad acts as a filter. In this way, on the basis of the interaction between the hot water and the coffee pad inside the brew chamber, a desired quantity of coffee is obtained.

A coffee maker as mentioned in the preceding paragraph is known from EP 0 771 542. For the purpose of heating water to a predetermined temperature, the known coffee maker comprises a heat exchanger having an electric resistor. During operation, water is instantly heated to the predetermined temperature while flowing through this heat exchanger. An electric pump is provided for realizing flows of water through the beverage maker, which are necessary in a process of making coffee. In order to accurately control the operation of the electric resistor of the heat exchanger and the operation of the pump, such that a predetermined temperature of water is obtained, the beverage maker comprises a temperature sensor for detecting the temperature reached by the water after having been heated by the heat exchanger and a control device which processes the signals received from the temperature sensor. Furthermore, a water delivery counter means is provided for measuring a quantity of water transferred to the brew chamber, and the control device is adapted to process simultaneously signals received from the temperature sensor and from the water delivery counter means. The signal received from the water delivery counter means is also suitable to be used for the purpose of controlling the quantity of beverage to be made.

SUMMARY OF THE INVENTION

On the one hand, the above-described known application of a control device, a temperature sensor and water delivery counter means for the purpose of controlling the operation of heating means and a pump of a beverage maker may yield good results, wherein a predetermined temperature of water is realized, but, on the other hand, the application of these components causes a cost price of the beverage maker to be relatively high. Therefore, it is an objective of the present invention to provide a method of controlling the operation of a beverage maker, which offers a possibility of avoiding the application of expensive components. The objective is achieved by a method for controlling the operation of a device for dispensing hot liquid, comprising a transporting system for transporting liquid through the device and heating means for heating liquid, comprising the steps of monitoring at least one physical property which is influenced by a displacement of liquid inside the transporting system, and, in case the heating means are in an activated condition, putting the heating means from the activated condition to a deactivated condition when a value of the physical property appears to have reached a predetermined value.

The method according to the present invention is particularly suitable to be applied for the purpose of controlling the operation of a device comprising a boiler having an interior space for containing a quantity of liquid, wherein the heating means are located in the boiler. When such a device is operated, liquid that is present inside the boiler is heated by means of the heating means, while at least one physical property which is influenced by a displacement of liquid inside the transporting system of the device is monitored. As soon as the physical property appears to have reached a predetermined value, the heating means are deactivated, and the heating process is terminated.

The method according to the invention is suitable to be applied in the context of different types of devices having a pump for causing liquid to flow through the device. One type of device is a device in which the pump is automatically started to pump hot liquid out of the boiler, at one side, and to pump cold liquid into the boiler, at another side, as soon as the temperature of the liquid that is present inside the boiler is at a predetermined value. When cheap components such as thermostats are applied for the purpose of controlling the operation of the heating means and the pump, due to a relatively high thermal delay of the thermostats, a situation in which the pump is activated while the heating means are still operating at full power may occur. In that situation, inside the boiler, a prolonged input of cold liquid into the boiler could cause thermal mixing between the hot liquid and the cold liquid, as a result of which the average temperature of liquid inside the boiler decreases and does not reach a set point of the thermostat for terminating the operation of the heating means. This situation may be avoided by setting a set point of the thermostat which is used for controlling the operation of the pump to a higher value. However, in that case, there is a risk the pump will not start after the heating process has been terminated. It is also possible that the pump will be started some time after the operation of the heating means is terminated, due to overshoot of the temperature of the liquid and slow response of the thermostat. However, it is not possible to obtain a consistent process, as the overshoot and the delay depend on the thermal stage of the components of the device, which is not the same for every time the device is operated.

When the method according to the present invention is applied, the point at which the heating means are deactivated is determined on the basis of measurements of at least one physical property which is influenced by a displacement of liquid inside the transporting system of the device. By monitoring a physical property which is influenced by a displacement of liquid that is directly caused by an operation of the pump, it is ensured the heating process is not terminated before the pump is started. The predetermined value of the physical property at which the heating means are deactivated may be chosen such that the overlap between the start of the operation of the pump and the termination of the operation of the heating means is small enough to avoid thermal mixing of hot liquid and cold liquid.

In another type of device, the pump is not automatically started, but is only started upon activation by a user of the device. In that case, the liquid inside the boiler is heated to the boiling point, and the at least one physical property which is influenced by a displacement of liquid inside the transporting system of the device is detected at a position just outside of the boiler, i.e. close to an outlet of the boiler. When the liquid boils, small quantities of liquid are pushed out of the boiler, as a result of which the physical property is influenced. The predetermined value of the physical property associated with deactivating the heating means may be adapted to this situation, so that the heating process is terminated when the liquid is boiling.

In any case, according to the present invention, the operation of the heating means is not controlled on the basis of a measurement of the temperature of the liquid inside the boiler. When relatively simple and cheap mechanical thermostats are applied in the process of controlling the operation of the device, an inconsistent behavior of the device and wrong settings of parameters of a process of dispensing liquid would be obtained in this way, due to sensing delay, relatively large tolerances of switching temperatures and hysteresis. According to the present invention, the point at which the heating means are deactivated is determined on the basis of ongoing measurements of at least one physical property which is influenced by a displacement of liquid inside the transporting system of the device. In this way, the heating means may be deactivated when the pump is operated such as to cause a displacement of the liquid, or when the liquid is boiling, for example.

In a practical embodiment of a device according to the present invention, the heating means are energized by an energizing circuit, which may be an electronics circuit, for example. Preferably, a combination of a switching device and a detecting device is applied for the purpose of monitoring the physical property and interrupting the energizing circuit when a value of the physical property appears to have reached a set point of the switching device. For example, the combination of a switching device and a detecting device that is applied may be a mechanical thermostat. In any case, in this context, a combination of a switching device and a detecting device should be understood such as to comprise two devices which are coupled to each other, wherein the switching device is capable of switching between an opened position for interrupting an energizing circuit and a closed position for closing an energizing circuit, and wherein the detecting device is capable of detecting a physical property and controlling the position of the switching device on the basis of a comparison of a detected value of the physical property and a set point of the switching device, which is directly related to a predetermined value of the physical property.

The physical property which is monitored may be a temperature of liquid that is present inside the transporting system. In such a case, the temperature of the liquid is not measured at a location where the liquid is heated, and a change of the temperature of the liquid is mainly caused by a displacement of the liquid. Instead, the temperature of the liquid may be detected at a location downstream of the location where the liquid is heated. In this way, when a pumping action is started automatically, it is ensured that a moment at which the heating means are deactivated is later than the moment at which the pumping action is started, and when a pumping action is started manually, it is ensured that the heating means are deactivated when the temperature of the heated liquid has reached the boiling point.

Besides a temperature of liquid, the physical property which is monitored may also be a pressure prevailing inside the transporting system of the device, a conductivity of liquid, or a flow of liquid, for example.

Advantageously, when the pump is started automatically, the moment at which this is done is determined by monitoring at least one physical property which is influenced by a heating action of the heating means, and putting the pump from a deactivated condition to an activated condition when a value of the physical property appears to have reached a predetermined value. For example, in case the device comprises a boiler, the temperature of the liquid inside the device may be detected, and a pumping action may be started as soon as the temperature appears to be above a predetermined value. In this respect, it is also possible to apply a relatively simple and cheap mechanical thermostat. Besides a temperature of the liquid, the physical property may also be a property related to thermal expansion, or a pressure measured in a confined or semi-confined enclosure, for example.

In practice, the method according to the present invention will be carried out by means of a device. According to the present invention, a device is provided, which is suitable to be controlled by applying the method as described in the foregoing and which comprises the following components:
  a system for transporting liquid through the device;
  heating means for supplying heat to the liquid;
  an energizing circuit having a heating circuit for energizing the heating means; and
  a combination of a switching device and a detecting device, wherein the switching device is arranged in the heating circuit, and which is capable of either interrupting or closing the heating circuit, wherein the detecting device is capable of monitoring at least one physical property which is influenced by a displacement of liquid inside the transporting system, and wherein the detecting device is adapted to put the switching device to a position for interrupting the heating circuit when a value of the physical property appears to have reached a set point of the switching device.

In this device, there is no need for a sophisticated control device for the purpose of accurately controlling the operation of the heating means in such a way that a predetermined temperature of the liquid is actually realized. Instead, all that is needed is an energizing circuit having a heating circuit for energizing the heating means, and a combination of a switching device and a detecting device for interrupting the supply of energy to the heating means when a value of at least one physical property which is influenced by a displacement of liquid inside the transporting system of the device and which is monitored by the detecting device appears to have reached a set point of the switching device. Preferably, the detecting device is capable of monitoring a temperature of liquid that is present inside the transporting system, and the combination of the switching device and the detecting device comprises a mechanical thermostat. In case the device comprises a boiler having an interior space for containing a quantity of liquid, wherein the heating means are located in the boiler, it is practical when the detecting device is located downstream of the boiler.

In a practical embodiment, the device according to the present invention further comprises:
  a pump for forcing liquid to flow through the device;
  at least one pumping circuit for energizing the pump, which is part of the energizing circuit of the device; and
  a combination of a switching device and a detecting device, wherein the switching device is arranged in the pumping circuit and capable of either interrupting or closing the pumping circuit, wherein the detecting device is capable of monitoring at least one physical property which is influenced by a heating action of the heating means, and wherein the detecting device is adapted to put the switching device to a position for closing the pumping circuit when a value of the physical property appears to have reached a set point of the switching device.

For example, the pump is activated as soon as a temperature of liquid which is heated by the heating means appears to have reached a predetermined value. The combination of the switching device and the detecting device which is used for the purpose of activating the pump at a suitable moment may comprise a simple thermostat.

The device according to the present invention may comprise two pumping circuits for energizing the pump, which are both part of the energizing circuit of the device, and which are configured in parallel; and a manually operable switching device for closing either of the pumping circuits. In this way, a user of the device is enabled to choose to have one of two predetermined quantities of the liquid, as each pumping circuit may comprise other control means for determining when a pumping action is terminated. It is noted that these control means may function in a similar manner, but may have different set points.

During operation of the device, a pumping action may be started automatically, but this is not necessary. It is also possible that the liquid is heated first, and that a moment at which the liquid is displaced through the device and is eventually dispensed by the device is determined by a user of the device at a later stage. In this case, it is preferred if the device comprises a switching device which is arranged in the pumping circuit, and which is only manually settable to a position for closing the pumping circuit.

In a preferred embodiment of the device having a boiler and a pump which is automatically started, a multi-way valve is arranged at an outlet of the liquid. For example, a three-way valve may be used, which is a component having one inlet and two outlets. It depends on the flow rate and the pressure which outlet is used for letting out liquid of the boiler. One of the outlets may be used for the purpose of returning liquid to the boiler or another container for containing liquid, whereas another of the outlets may be used for letting out liquid to a duct for transporting liquid further through the device. When the flow rate is relatively low, the first outlet is used, and when the flow rate is relatively high, which is the case when the liquid is forced to flow out of the boiler under the influence of a pumping action, the second outlet is used. In this way, assuming that the detecting device for controlling the operation of the switching device arranged in the heating circuit is located at a position downstream of the second outlet of the three-way valve, it is achieved that the heating means are controlled in a reliable manner, even when a mechanical thermostat is used, as the heating means will never be deactivated before a pumping action is started.

In many cases, the device according to the present invention comprises a refillable tank for containing liquid and supplying liquid when the device is operated, and a quantity of hot liquid is replaced by a quantity of cold liquid from the tank. Preferably, safety measures are applied for avoiding a situation in which the operation of the device is initiated when the tank does not contain a minimum quantity of liquid. For example, the device may comprise an actuation member which is movable to a position for setting the switching device arranged in the heating circuit to the position for closing the heating circuit; a mechanism for blocking the actuation member; and a floating member which is located in the tank, which is intended to be at least partially inserted in the liquid, and which is adapted to activate the blocking mechanism when a level of the liquid in the tank is below a predetermined minimum level.

The above-described and other aspects of the present invention will be apparent from and elucidated with reference to four embodiments of a beverage maker according to the present invention as described hereinafter.

BRIEF DESCRIPTION OF THE DRAWINGS

The present invention will now be explained in greater detail with reference to the figures, in which equal or similar parts are indicated by the same reference signs, and in which.

DETAILED DESCRIPTION OF EMBODIMENTS

Figure 1:
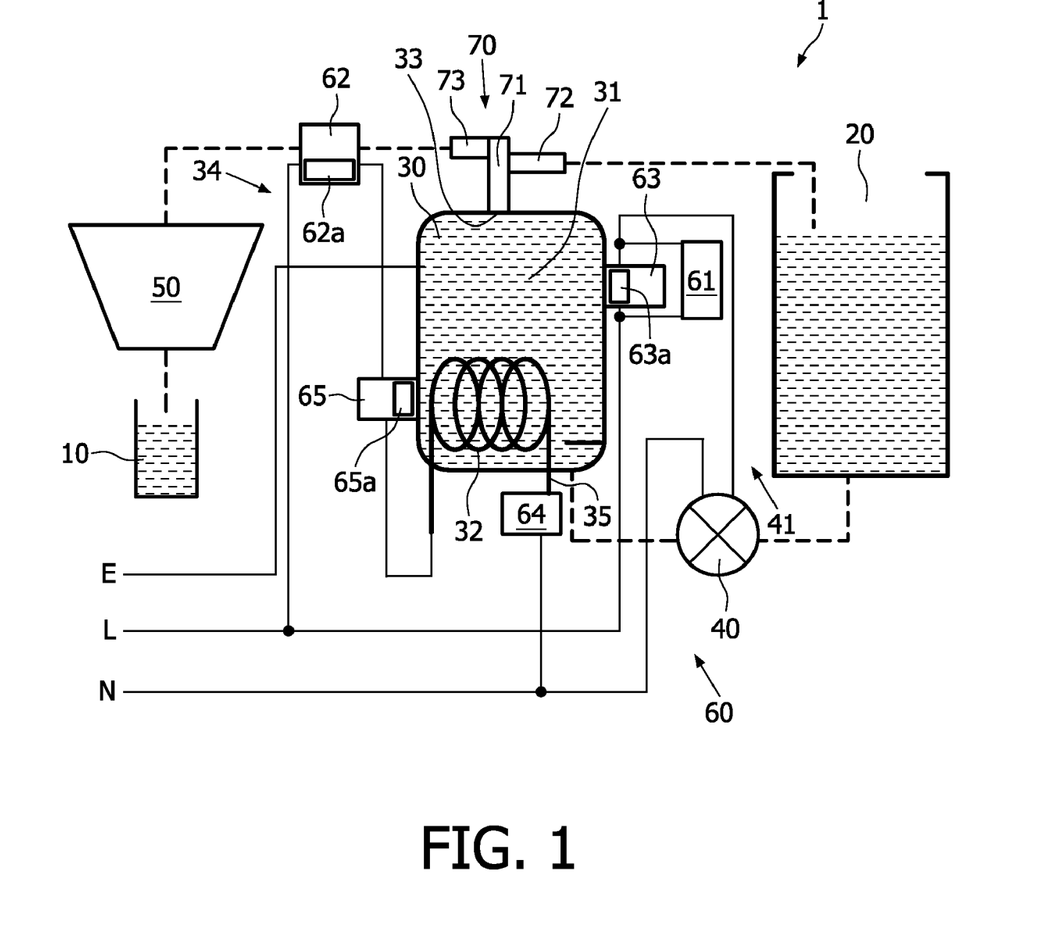
FIG. 1 diagrammatically shows components and an electronics circuit of a beverage maker according to a first preferred embodiment of the present invention.

FIG. 1 diagrammatically shows components 20, 30, 40, 50, 70 and an electronics circuit 60 of a beverage maker 1 according to a first preferred embodiment of the present invention, which will hereinafter be referred to as first beverage maker 1. This beverage maker 1 is suitable for making coffee on the basis of hot water and a coffee pad (not shown) filled with ground coffee beans, which does not alter the fact that the beverage maker 1 may just as well be suitable for preparing other hot drinks. Besides the components 20, 30, 40, 50, 70 and the electronics circuit 60 of the first beverage maker 1, FIG. 1 also shows a container 10 such as a cup for receiving the coffee from the beverage maker 1.

The first beverage maker 1 comprises a water tank 20 for containing water, a boiler 30 having an interior space 31 for containing water and a heating element 32 for supplying heat to the water, an electric pump 40 for pumping water from the water tank 20 to the boiler 30, and a sealable brew chamber 50 for receiving and accommodating a coffee pad.

At a water outlet 33 of the boiler 30, a three-way valve 70 is arranged, which comprises an inlet 71, a first outlet 72 and a second outlet 73. The first outlet 72 serves for returning water to the water tank 20, whereas the second outlet 73 serves for conducting water in the direction of the brew chamber 50.

When a user desires to make a quantity of coffee by using the first beverage maker 1, the user inserts a coffee pad into the brew chamber 50, and activates the beverage maker 1. In case the boiler 30 appears to be empty, the user activates the pump 40 first, in order to fill the boiler 30 by pumping water from the water tank 20 to the boiler 30. As a first step in a process of making coffee, the water inside the boiler 30 is heated by means of the heating element 32. When the temperature of the water has reached a predetermined level, the pump 40 is activated automatically, so that cold water is transported from the water tank 20 to the boiler 30, and hot water is transported from the boiler 30 to the brew chamber 50. In the process, as a second step in a process of making coffee, inside the brew chamber 50, an interaction between the hot water and the quantity of ground coffee beans that is contained by the coffee pad takes place. As a result, hot coffee is obtained, which flows from the brew chamber 50 to the cup 10. The quantity of the water that is used in the process of making coffee is adapted to the quantity of ground coffee beans that is used. In FIG. 1, a path of the water through the first beverage maker 1 is diagrammatically depicted as a dotted line.

The electronics circuit 60 of the first beverage maker 1 comprises several components, which will be identified in the following description of the way in which the above-described operation of the beverage maker 1 is controlled.

The electronics circuit 60 comprises a power switch 61, which is activated by the user when the boiler 30 needs to be filled with water before the heating element 32 of the boiler 30 is activated. The power switch 61 is adapted to open or close a pumping circuit 41 which is part of the electronics circuit 60, and which serves for supplying electric power to the pump 40.

Furthermore, the electronics circuit 60 comprises a thermostat 62, which is only manually settable to a closed condition, and which comprises a sensing member 62a for sensing a temperature of water at a location between the boiler 30 and the brew chamber 50. The manually operable thermostat 62 is adapted to open or close a heating circuit 34 which is part of the electronics circuit 60, and which serves for supplying electric power to the heating element 32 of the boiler 30.

Besides the power switch 61 and the manually operable thermostat 62 as described in the foregoing, the electronics circuit 60 of the first beverage maker 1 comprises a normally opened thermostat 63, i.e. a thermostat 63 that switches to a closed position when a temperature that is detected by a sensing member 63a of the thermostat 63 exceeds a set point of the thermostat 63. The normally opened thermostat 63 is arranged in the pumping circuit 41, and the sensing member 63a of the thermostat 63 is arranged at a position in the boiler 30.

When the thermostat 62 arranged in the heating circuit 34 is closed by the user, the water inside the boiler 30 is heated. In the process, any water that is overflowing from the boiler 30 is diverted back to the water tank 20 through the first outlet 72 of the three-way valve 70. The heating process is continued until a temperature of the water reaches a set point of the normally opened thermostat 63. At that moment, the thermostat 63 switches to a closed position, as a result of which the pumping circuit 41 is closed and the pump 40 is activated. Under the influence of the pump 40, water is displaced through the first beverage maker 1, wherein cold water is transported from the water tank 20 to the boiler 30, and wherein hot water is transported from the boiler 30 to the brew chamber 50. On the way to the brew chamber, the hot water passes the sensing member 62a of the thermostat 62 arranged in the heating circuit 34. The set point of the thermostat 62 is chosen such that the thermostat 62 switches to an opened position as soon as the hot water reaches the sensing member 62a. At that moment, the heating circuit 34 is interrupted, and the heating action is terminated. Hence, in the first beverage maker 1, the heating action is terminated a certain period of time after the pumping action is started, wherein the length of this period of time depends on the location of the sensing member 62a of the thermostat 62 with respect to the second outlet 73 of the three-way valve 70.

During a pumping action, hot water exits the boiler 30 and cold water enters the boiler 30, wherein a separation layer is present between the two different quantities of water. The normally opened thermostat 63 switches back to an opened position as soon as a front of the cold water reaches the sensing member 63a of the thermostat 63, and the detected temperature suddenly falls below a set point of the thermostat 63. At that moment, the operation of the pump 40 is terminated.

It follows from the preceding paragraph that the time during which the pump 40 is operated for the purpose of pumping cold water into the boiler 30 and hot water out of the boiler 30 is determined by the position of the sensing member 63a of the normally opened thermostat 63 with respect to a water inlet 35 of the boiler 30. Consequently, the quantity of the water that is displaced during a pumping action is determined by the position of the sensing member 63a of the normally opened thermostat 63 with respect to the water inlet 35 of the boiler 30. Therefore, the quantity of coffee that is made during operation of the first beverage maker 1 is accurately controlled on the basis of the application of the normally opened thermostat 63.

In order to ensure safety during operation of the first beverage maker 1, the electronics circuit 60 comprises a thermal fuse 64 which is connected in series with the heating element 32 of the boiler 30. Furthermore, the electronics circuit 60 comprises a normally closed thermostat 65, i.e. a thermostat 65 that switches to an opened position when a temperature that is detected by a sensing member 65a of the thermostat 65 exceeds a set point of the thermostat 65. The normally closed thermostat 65 is arranged in the heating circuit 34, and the sensing member 65a of the thermostat 65 is arranged such as to detect the temperature of the heating element 32 of the boiler 30. As soon as the temperature of the heating element 32 exceeds a set point of the normally closed thermostat 65, the thermostat 65 switches to an opened position, and the power supply to the heating element 32 is interrupted. By means of the normally closed thermostat 65, a situation in which the temperature of the heating element 32 gets dangerously high, which may occur in case there is no water in the boiler 30, is avoided.

In case the water tank 20 is empty during operation of the pump 40, no flow of water to the brew chamber 50 is obtained, so that the supply of freshly brewed hot coffee from the beverage maker 1 is stopped. Furthermore, the sound that is generated by the pump 40 during operation will be louder than usual. On the basis of these two effects of an empty water tank 20, the user is notified of the situation. Consequently, there is no need for the application of an additional sensor or the like for checking the water level in the water tank 20 and warning the user when the water tank 20 is empty. In this way, the electronics circuit 60 is kept simple and costs are kept at a low level. Although it is preferred to avoid the application of an additional sensor or the like, such application is not excluded within the scope of the present invention.

It follows from the above description of the first beverage maker 1 that all that a user needs to do for the purpose of obtaining coffee is putting the thermostat 62 to the closed position. From that moment on, the process of making coffee and supplying the coffee to the cup 10 is performed automatically. In the process, the normally opened thermostat 63 switches to a closed position when the temperature of the water inside the boiler 30 has reached a predetermined level, the thermostat 62 switches back to the opened position when the temperature of water that has been heated inside the boiler 30 and that passes the sensing member 62a of the thermostat 62 reaches a predetermined level, and the normally opened thermostat 63 switches back to the opened position when the temperature of the water inside the boiler 30 falls below a predetermined level. The latter takes place when a separation layer between cold water and hot water, which moves through the boiler 30 during a pumping action, reaches the sensing member 63a of the normally opened thermostat 63.

When the pump 40 is defective, or when the pump 40 is not running for any other reason, the water that is present inside the boiler 30 will be heated until it starts to boil, as there is no forced flow of hot water passing the sensing member 62a of the thermostat 62 arranged in the heating circuit 34. However, due to the boiling process, pressure and flow rate increase, and a small quantity of water exists the boiler 30 through the second outlet 73. When this quantity of water has reached the sensing member 62a of the thermostat 62, the sensing member 62a detects a water temperature that is above the set point, and the thermostat 62 is put to the opened position for interrupting the heating circuit 34 and terminating the operation of the heating element 32.

Figure 2:
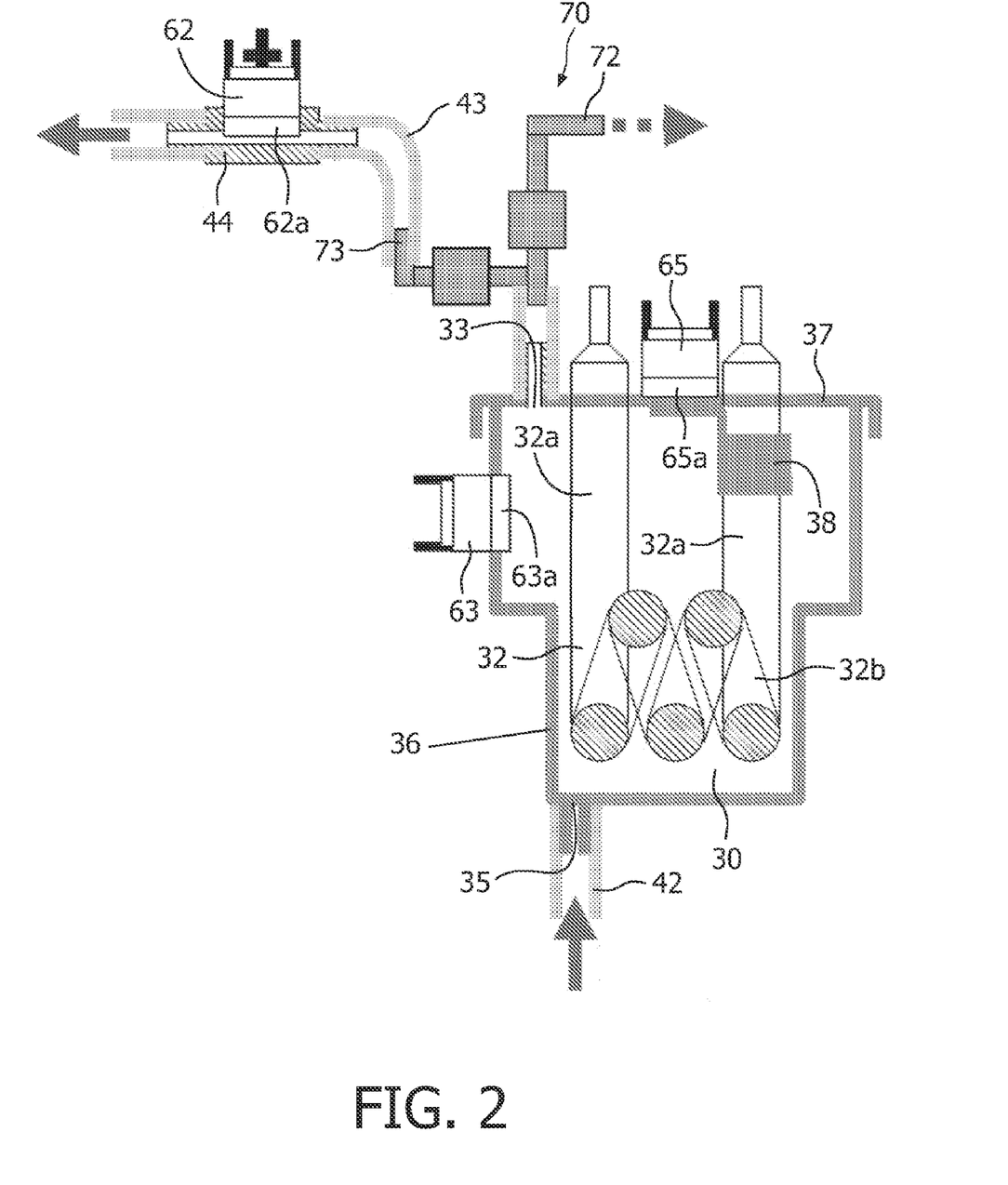
FIG. 2 diagrammatically shows a possible configuration of a number of components of the beverage maker shown in FIG. 1.

In FIG. 2, a number of components of the first beverage maker 1 are shown in more detail, in a preferred configuration.

The boiler 30 as shown comprises a plastic bottom portion 36 and a metal top portion 37. At the bottom of the plastic bottom portion 36, the water inlet 35 of the boiler is present, and a rubber hose 42, which is only partially shown in FIG. 2, is provided for connecting the pump 40, which is not shown in FIG. 2, to the water inlet 35. At the side of the water outlet 33, another flexible hose 43 is provided, namely a hose 43 for connecting the second outlet 73 of the three-way valve 70 to the brew chamber 50. This hose 43 is also only partially shown in FIG. 2, whereas the brew chamber 50 is not shown.

In the shown example, the heating element 32 of the boiler 30 is substantially U-shaped, and comprises two legs 32a and a coil 32b extending between ends of these legs 32a. The sensing member 65a of the normally closed thermostat 65 is connected to one of the legs 32a of the heating element 32 through a thermal bridge 38.

FIG. 2 shows that the sensing member 63a of the thermostat 63 which is arranged in the pumping circuit 41 is located in the bottom portion 36 of the boiler 30, at a considerable distance with respect to the water inlet 35 of the boiler 30. In this way, it is ensured that a pumping action is stopped when a predetermined volume of water is displaced through the beverage maker 1. FIG. 2 also shows that the sensing member 62a of the manually settable thermostat 62 is arranged in an insert piece 44 that is located in the flexible hose 43 for connecting the second outlet 73 of the three-way valve 70 to the brew chamber 50, at a certain distance with respect to the second outlet 73. When the pump 40 is activated, hot water is allowed to enter the hose 43 through the second outlet 73, and as soon as the hot water reaches the sensing member 62a of the thermostat 62, the thermostat 62 is operated such as to interrupt the heating circuit 34.

For sake of completeness, it is noted that in FIG. 2, directions of a flow of water through the hose 42 connected to the water inlet 35 of the boiler 30 and a flow of water through the hose 43 connected to the second outlet 73 of the three-way valve 70 are indicated by a continuous arrow, and that a flow of water through the first outlet 72 of the three-way valve 70, which is relatively small and which takes place when the heating element 32 is activated and the pump 40 is still deactivated, is indicated by a dotted arrow.

Figure 3:
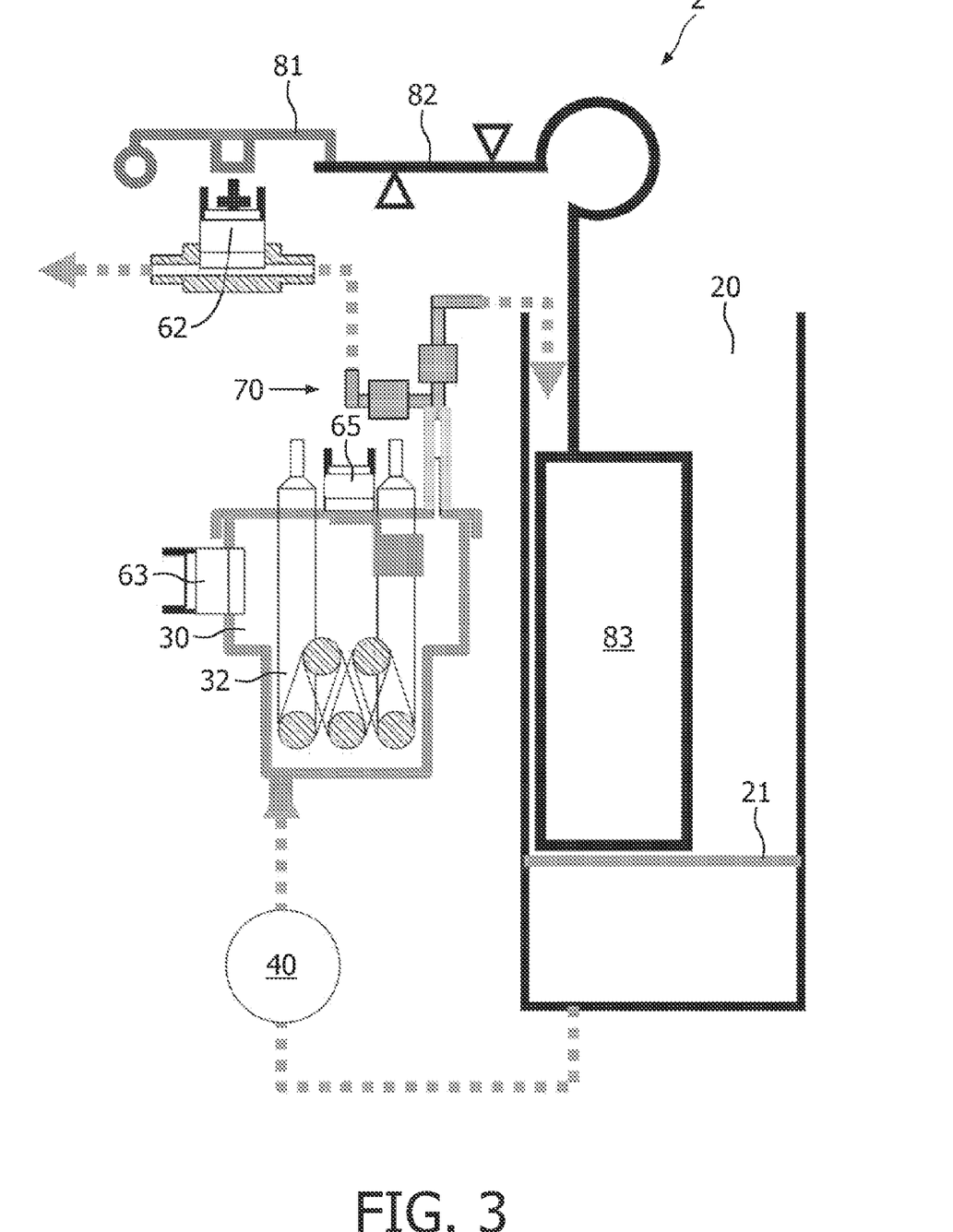
FIG. 3 diagrammatically shows a possible configuration of a number of components of a beverage maker according to a second preferred embodiment of the present invention.

FIG. 3 diagrammatically shows components 20, 30, 40, 62, 63, 65, 70 of a beverage maker 2 according to a second preferred embodiment of the present invention, which will hereinafter be referred to as second beverage maker 2.

The second beverage maker 2 resembles the first beverage maker 1 to a large extent. The only difference between the second beverage maker 2 and the first beverage maker 1 resides in the fact that the second beverage maker 2 is protected against dry pumping of the water tank 20. In view of the fact that the pump 40 is degraded and damaged when there is no water to be pumped, it is desirable to have a dry pump protection.

The second beverage maker 2 comprises an actuation member 81 by means of which the manually settable thermostat 62 may be put to the closed condition and a mechanism 82 for blocking the actuation member 81. For the purpose of activating the blocking mechanism 82 when a level 21 of the water in the water tank 20 is at a predetermined minimum or below this predetermined minimum, a float 83 is provided, which is arranged in the water tank 20, and which is intended to be at least partially inserted in the water. When the level 21 of the water inside the water tank 20 is at the predetermined minimum or below the predetermined minimum, the blocking mechanism 82 is activated under the influence of the weight of the float 83, and a user of the beverage maker 2 can not put the actuation member 81 to the position for putting the thermostat 62 to the closed position until water is added to the water tank 20, such that the level 21 of the water rises above the predetermined minimum level, and the float 83 is lifted by the water again.

By using the blocking mechanism 82 and the float 83, a prevention of dry pumping of the beverage maker 2 is realized in a mechanical manner, wherein there is no need for applying an additional electrical component. As long as the level 21 of the water in the water tank 20 is below the minimum level, both the heating element 32 and the pump 40 can not be activated. Within the scope of the present invention, other manners of realizing such a dry pump protection exist, but the above-described dry pump protection is advantageous, as it does not involve high costs and is very reliable.

Figure 4:
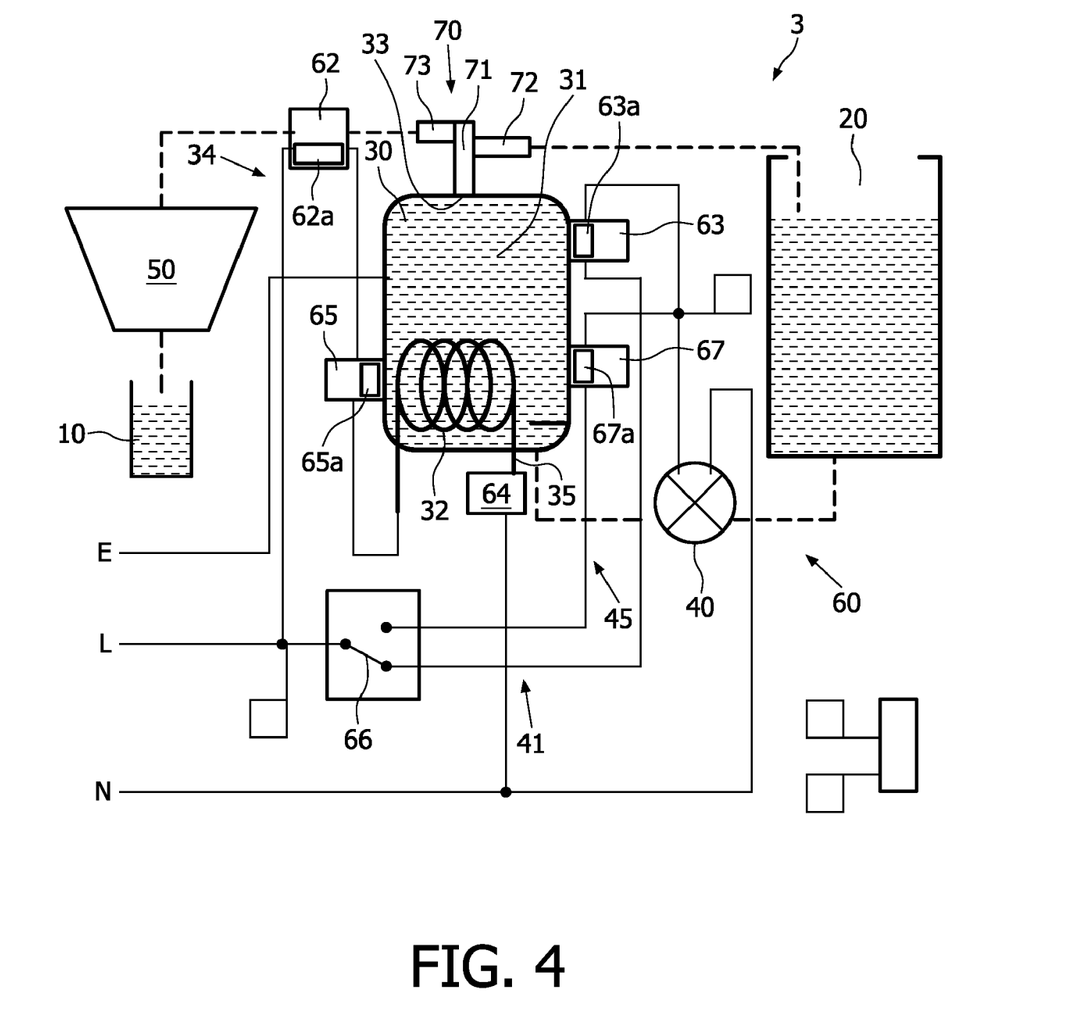
FIG. 4 diagrammatically shows components and an electronics circuit of a beverage maker according to a third preferred embodiment of the present invention.

FIG. 4 diagrammatically shows components 20, 30, 40, 50, 70 and an electronics circuit 60 of a beverage maker 3 according to a third preferred embodiment of the present invention, which will hereinafter be referred to as third beverage maker 3.

The third beverage maker 3 resembles the first beverage maker 1 to a large extent. The only difference between the third beverage maker 3 and the first beverage maker 1 resides in the fact that the third beverage maker 3 offers a user of the beverage maker 3 a choice between two predetermined quantities of beverage, wherein the user can decide whether to have a relatively small quantity of beverage or a relatively large quantity of beverage. To this end, the third beverage maker 3 comprises a two pumping circuits 41, 45, which are both part of the electronics circuit 60 of the beverage maker 3, and which are configured in parallel, and a manually operable selection switch 66 for closing either of the pumping circuits 41, 45.

Each of the pumping circuits 41, 45 comprises a normally opened thermostat 63, 67 having a sensing member 63a, 67a which is arranged such as to detect a temperature of the water that is present inside the boiler 30, wherein the sensing members 63a, 67a of the thermostats 63, 67 are arranged at different positions with respect to the water inlet 35 of the boiler 30. The sensing member 63a of the thermostat 63 of a first pumping circuit 41 is positioned further away from the water inlet 35 of the boiler 30 than the sensing member 67a of the thermostat 67 of a second pumping circuit 45. As the moment at which a pumping action is terminated is related to the moment at which a separation layer between hot water and cold water reaches the level of a sensing member 63a, 67a, it is clear that when the first pumping circuit 41 is used for energizing the pump 40, the quantity of water that is used in a beverage making process is larger than when the second pumping circuit 45 is used.

Thus, in the third beverage maker 3, the user is enabled to choose between two predetermined quantities of beverage. Apart from that, the third beverage maker 3 functions in the same manner as the first beverage maker 1. It is noted that like the second beverage maker 2, the third beverage maker 3 may also be provided with dry pump protection.

Figure 5:
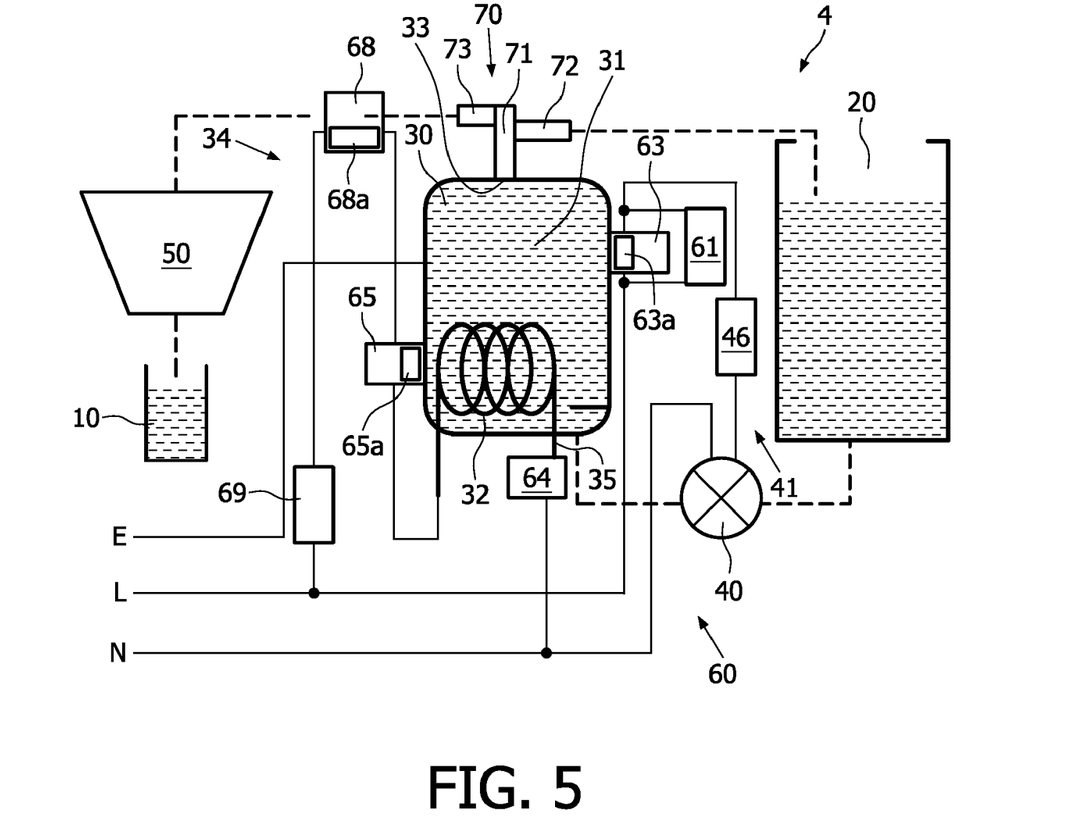
FIG. 5 diagrammatically shows components and an electronics circuit of a beverage maker according to a fourth preferred embodiment of the present invention.

FIG. 5 diagrammatically shows components 20, 30, 40, 50, 70 and an electronics circuit 60 of a beverage maker 4 according to a fourth preferred embodiment of the present invention, which will hereinafter be referred to as fourth beverage maker 4.

The fourth beverage maker 4 resembles the first beverage maker 1 to a large extent. The only difference between the fourth beverage maker 4 and the first beverage maker 1 resides in the fact that the fourth beverage maker 4 offers a user of the beverage maker 4 to manually start a pumping action. Hence, in the fourth beverage maker 4, the pumping action is not automatically started when the temperature of the water inside the boiler 30 has reached a predetermined value.

In comparison with the first beverage maker 1, the fourth beverage maker 4 does not comprise the manually settable thermostat 62 for terminating a heating action when hot water is pumped out of the boiler 30. Instead, the fourth beverage maker 4 comprises a normally closed thermostat 68 which is arranged at a position downstream of the second outlet 73 of the three-way valve 70. This thermostat 68 is arranged in series with a main switch 69. Furthermore, the fourth beverage maker 4 comprises a manually operable pump switch 46 which is arranged in the pumping circuit 41.

When the user of the fourth beverage maker 4 puts the main switch 69 to a closed position, the heating circuit 34 is closed and the heating element 32 of the boiler 30 is activated. The heating process is continued until the water starts to boil, and a small quantity of water is pushed out of the boiler 30, through the second water outlet 73 of the three-way valve 70. Due to the presence of this water near a sensing member 68a of the normally closed thermostat 68, a set point of the thermostat 68 is reached, the thermostat 68 switches from a closed position to an opened position, and the heating circuit 34 is interrupted.

In the fourth beverage maker 4, the pump 40 is not activated automatically. Instead, the pump 40 is only activated when the pump switch 46 is manually put to a closed position. Under the influence of the functioning of the normally opened thermostat 63, a pumping action is terminated when a predetermined quantity of water has been displaced.

When the sensing member 68a of the normally closed thermostat 68 is cooled down naturally, the heating element 32 will be activated again, and will cause the water in the boiler 30 to boil again.

A specific feature of the fourth beverage maker 4 is that the start of a pumping action is not directly related to a heating process. Due to the fact that the normally closed thermostat 68 is positioned outside of the boiler 30, namely downstream of the boiler 30, it is ensured that the water inside the boiler 30 is always boiling before the heating element 32 of the boiler 30 is deactivated. Only when the water is boiling, a quantity of water is pushed out through the second outlet 73 of the three-way valve 70, and passes the sensing member 68a of the thermostat 68. On the basis of the fact that the thermostat 68 is located outside of the boiler 30, the thermal mass of the thermostat 68 can be reduced, so that the hysteresis of the system for controlling the operation of the heating element 32 can be reduced. Consequently, the thermostat 68 will always be cooling down faster than the water inside the boiler 30, and the performance of the control system in terms of water temperature range over time with reference to an ideal beverage making temperature, for example a range of 90° C. to 96° C., is reduced.

It will be clear to a person skilled in the art that the scope of the present invention is not limited to the examples discussed in the foregoing, but that several amendments and modifications thereof are possible without deviating from the scope of the present invention as defined in the attached claims. While the present invention has been illustrated and described in detail in the figures and the description, such illustration and description are to be considered illustrative or exemplary only, and not restrictive. The present invention is not limited to the disclosed embodiments.

The present invention is applicable in any coffee maker, including coffee makers which are adapted to make coffee in another manner than by using at least one coffee pad. Furthermore, it should be understood that although the beverage makers 1, 2, 3, 4 as described and shown in the foregoing are described as being suitable for making coffee, the present invention is applicable in any beverage maker which is adapted to make a hot beverage, wherein such beverage does not necessarily need to be coffee. In general, the present invention is applicable in any device which is adapted to dispense hot liquid.

Other variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the present invention.

In the foregoing, a beverage maker 1, 2, 3, 4 for making a hot beverage such as coffee is described. The beverage maker 1, 2, 3, 4 comprises a boiler 30 having an interior space 31 for containing a quantity of water and a heating element 32 for supplying heat to the water, and a pump 40 for displacing water through the beverage maker 1, 2, 3, 4. When the beverage maker 1, 2, 3, 4 is operated, the heating element 32 is activated, and the water inside the boiler 30 is heated. According to a possibility existing within the scope of the present invention, when the temperature of the water inside the boiler 30 has reached a predetermined value, a thermostat 63 which is arranged in an electronics circuit 41 for energizing the pump 40 is closed, and a pumping action is started. As a result, water exits the boiler 30 through a water outlet 33 of the boiler, and passes a thermostat 62 which is arranged downstream of the boiler 30, and which is arranged in an electronics circuit 34 for energizing the heating element 32. Under the influence of the hot water, a set point of this thermostat 62 is reached, and this thermostat 62 opens, so that the electronics circuit 34 for energizing the heating element 32 is interrupted, and the heating element 32 is deactivated.

In general, in a beverage maker 1, 2, 3, 4 according to the present invention, a heating process is terminated when a displacement of water, which may be caused by a pumping action or the heating process itself, for example, takes place. When the present invention is applied, it is possible to control the heating process in a sufficiently accurate manner, while using relatively simple components such as mechanical thermostats.

The invention claimed is:

1. A method for controlling the operation of a device for dispensing hot liquid, the method comprising a transporting system for the acts of:
   transporting liquid through the device by a transporting system using a pump;
   heating the liquid by a heater in a boiler having an inlet for receiving cold liquid and an outlet for outputting the hot liquid, wherein the boiler includes a separation layer between the hot liquid and the cold liquid;
   monitoring at least one physical property which is influenced by a displacement of the liquid inside the transporting system;
   when the heater is in an activated condition, putting the heater from the activated condition to a deactivated condition when a value of the physical property reaches a predetermined value;
   providing a first pumping circuit having a first sensing member and a second pumping circuit having a second sensing member, wherein the first sensing member and the second sensing member are configured to sense a temperature of the separation layer in the boiler;
   selecting one of the first pumping circuit and the second pumping circuit;
   deactivating the pump when the temperature sensed by the first sensing member reaches the predetermined value when the first pumping circuit is selected; and
   deactivating the pump when the temperature sensed by the second sensing member reaches the predetermined value when the second pumping circuit is selected;
   wherein the first sensing member is further away from the inlet than the second sensing member so that a larger quantity of the hot liquid is provided when the first pumping circuit is selected compared to a quantity of the hot liquid when the second pumping circuit is selected.

2. The method according to claim 1, further comprising the acts of:
   energizing the heater by an energizing circuit, wherein the monitoring act is performed using a combination of a switching device and a detecting device; and
   interrupting the energizing circuit when a value of the physical property reaches a set point of the switching device.

3. The method according to claim 1, wherein the physical property which is monitored is a temperature of the liquid that is present inside the transporting system.

4. The method according to claim 3, further comprising the act of detecting the temperature of the liquid at a location downstream of the boiler.

5. A device for dispensing hot liquid comprising:
   a boiler for holding liquid;
   a system for transporting the liquid through the device using a pump;
   a heater configured to supply heat to the liquid in the boiler;
   an energizing circuit having a heating circuit for energizing the heater;
   a combination of a switching device and a detecting device, wherein the switching device is arranged in the heating circuit, and is configured either to interrupt or close the heating circuit, wherein the detecting device is configured to monitor at least one physical property which is influenced by a displacement of the liquid inside the transporting system, and wherein the detecting device is configured to put the switching device to a position for interrupting the heating circuit when a value of the physical property reaches a set point of the switching device;
   a first pumping circuit having a first sensing member and a second pumping circuit having a second sensing member, wherein the first sensing member and the second sensing member are configured to sense a temperature of a layer of the liquid in the boiler;
   wherein the pump is deactivated when the temperature sensed by the first sensing member reaches a predetermined value when the first pumping circuit is selected;
   wherein the pump is deactivated when the temperature sensed by the second sensing member reaches the predetermined value when the second pumping circuit is selected; and
   wherein the first sensing member is further away from the inlet than the second sensing member so that a larger quantity of the hot water is provided when the first pumping circuit is selected compared to a quantity of the hot water when the second pumping circuit is selected.

6. The device according to claim 5, wherein the detecting device is configured to monitor a temperature of the liquid that is present inside the transporting system.

7. The device according to claim 6, wherein the detecting device is located downstream of the boiler.

8. The device according to claim 7, further comprising a multi-way valve arranged at an outlet of the boiler.

9. The device according claim 5, further comprising a switching device which is arranged in the first pumping circuit, and which is only manually settable to a position for closing the first pumping circuit.

10. The device according to claim 5, further comprising:
    an actuation member which is movable to a position for setting the switching device arranged in the heating circuit to the position for closing the heating circuit;
    a refillable tank for containing the liquid;
    a blocking mechanism for blocking the actuation member; and
    a floating member which is located in the refillable tank, wherein the floating member is at least partially inserted in the liquid, and is configured to activate the blocking mechanism when a level of the liquid in the refillable tank is below a predetermined minimum level.

* * * * *